E. E. McINTYRE.
STEERING KNUCKLE FOR AUTOMOBILES OR MOTOR VEHICLES.
APPLICATION FILED MAR. 11, 1916.
1,252,282.   Patented Jan. 1, 1918.
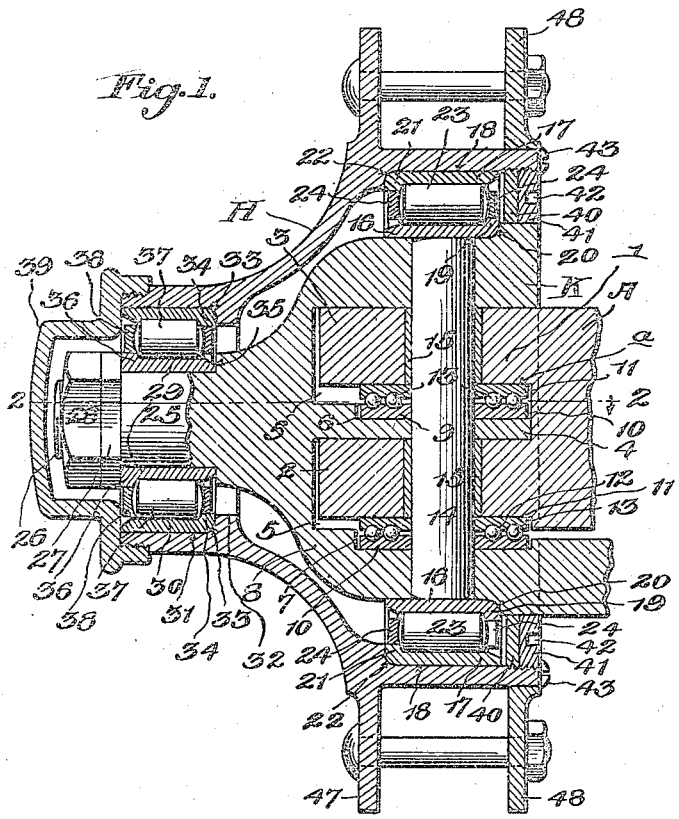
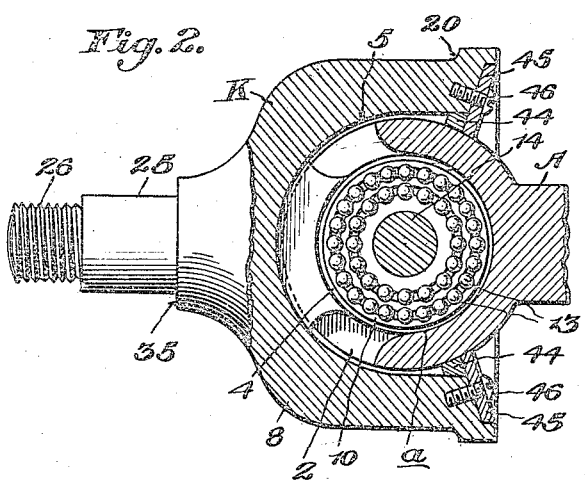
Inventor.
Elmer E. McIntyre,

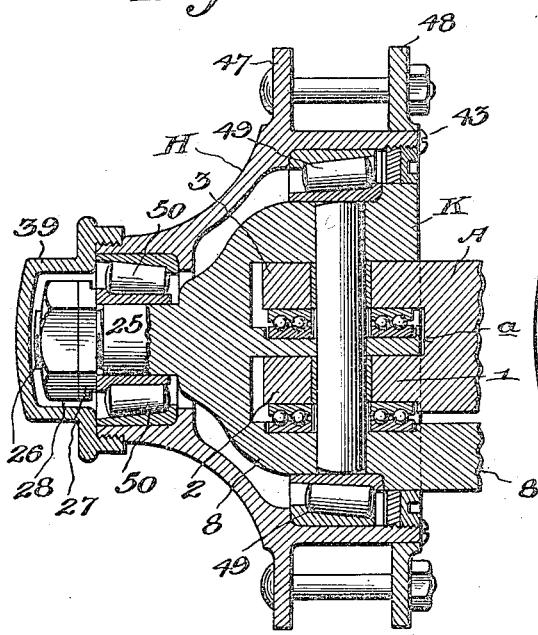
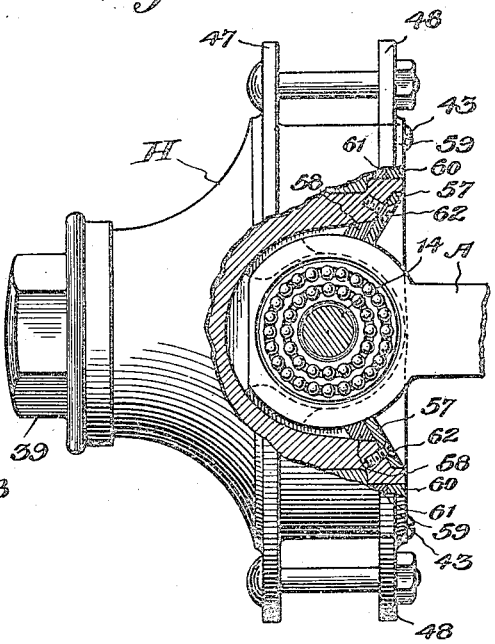
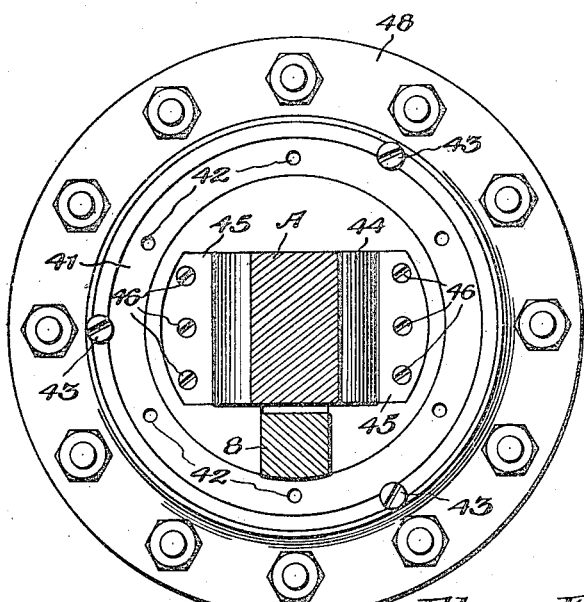

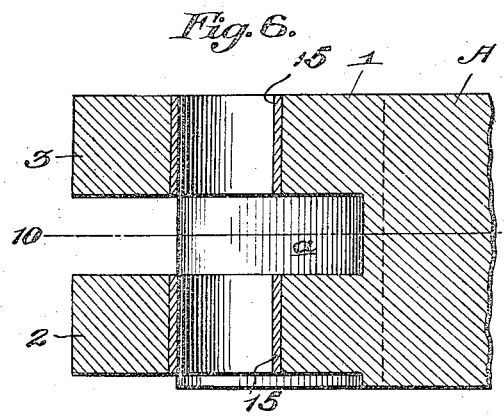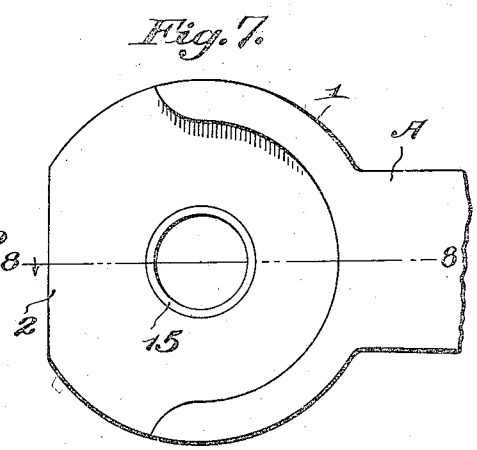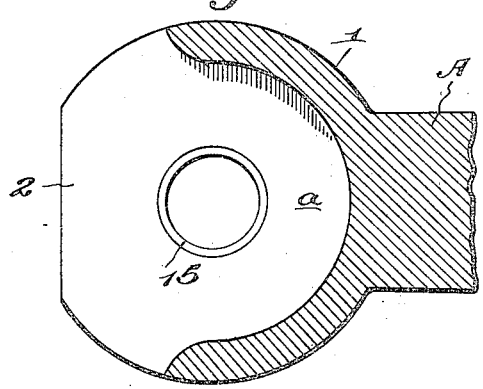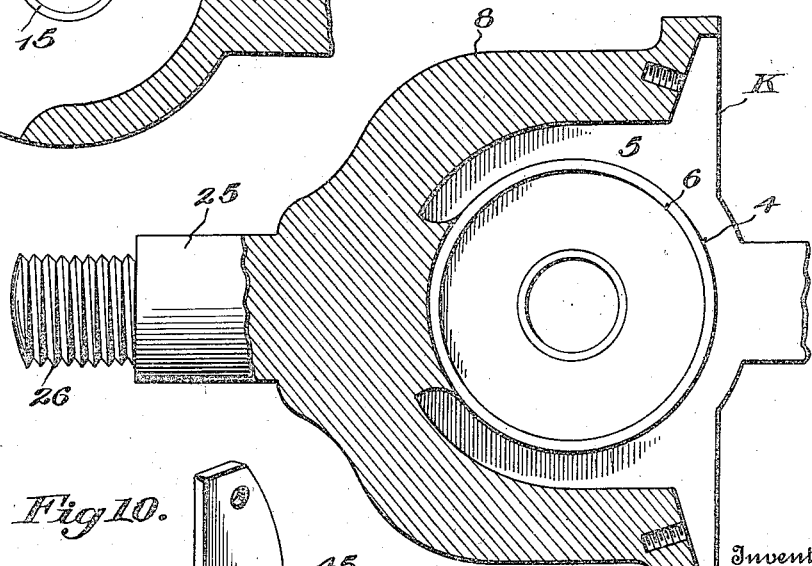

UNITED STATES PATENT OFFICE.

ELMER E. McINTYRE, OF PITTSBURGH, PENNSYLVANIA.

STEERING-KNUCKLE FOR AUTOMOBILES OR MOTOR-VEHICLES.

1,252,282.  Specification of Letters Patent.  Patented Jan. 1, 1918.

Application filed March 11, 1916. Serial No. 83,497.

*To all whom it may concern:*

Be it known that I, ELMER E. MCINTYRE, a citizen of the United States of America, residing at Pittsburgh, in the county of Allegheny and State of Pennsylvania, have invented certain new and useful Improvements in Steering-Knuckles for Automobiles or Motor-Vehicles, of which the following is a specification.

This invention relates to steering knuckles for automobiles and other motor vehicles. The objects of the invention are, to improve, simplify and render more stable the connection between the axle and steering knuckle with a view to minimize friction, practically to eliminate danger of breakage under ordinary conditions of use, and to facilitate repairs when needed; to improve the manner of disposing the antifriction bearings between the stub-axle and the hub, whereby to insure the easy running of the parts and the practical preclusion of binding or locking should there be a temporary lack of lubricant; to improve the manner of holding the hub-packing combined with the hub and stub-axle, whereby to permit a ready adjustment of the packing-ring to prevent escape of the lubricant and to exclude the entrance of dust or other undesirable matter; to improve the manner of holding the packing between the stub-axle and axle end, whereby to permit a greater pivoting of said stub-axle on said axle end, and for the purpose of preventing the entrance of dust, mud, slush, etc., to the interior of said stub-axle; to improve the construction of the axle end, whereby a broad surface is provided for the reception of thrust bearings between the stub-axle and axle, and generally to provide a strong, durable and practical form of steering knuckle.

With the above and other objects in view, as will appear as the nature of the invention is better understood, the same consists in the novel arrangement and combination of the parts of a steering knuckle for automobiles and other motor vehicles as will be hereinafter fully described and claimed.

In the accompanying drawings forming a part of this specification, and in which like characters of reference indicate corresponding parts:

Figure 1 is a vertical longitudinal sectional view of one form of steering knuckle, hub and axle embodied in the invention.

Fig. 2 is a horizontal sectional view taken on line 2—2, Fig. 1.

Fig. 3 is a similar view to Fig. 1, of a slightly modified form of the invention.

Fig. 4 is a view in rear elevation of the hub and stub-axle shown in Figs. 1 and 3, the axle being in section.

Fig. 5 is a top plan view of the hub and stub-axle, partly in section, showing a different arrangement of hub packing ring from that exhibited in Figs. 1 and 3.

Fig. 6 is a vertical longitudinal sectional view of the axle end taken on line 8—8, Fig. 7.

Fig. 7 is a bottom plan view of the axle end shown in Fig. 6.

Fig. 8 is a horizontal sectional view taken on line 10—10, Fig. 6.

Fig. 9 is a central horizontal sectional view of the stub-axle taken on line 2—2, Fig. 1, the axle end and bearings being removed.

Fig. 10 is a perspective view of one of the packing plates for holding the packing between the stub-axle and the curved sides of the axle ends.

Referring to the drawings, and to Figs. 1 and 2 thereof, A designates the axle, K the stub-axle, and H the hub. The axle is provided at each extremity with a substantially circular boss 1. These bosses are, preferably, horizontally cleft, said cleft communicating with an open-end semicircular recess *a*, the side walls of which at the open end thereof are, preferably, beveled, as clearly shown in Figs. 6 and 8, providing two ends 2 and 3, the cleft and semicircular recess *a* being engaged in part by a tongue 4 projecting axially and horizontally from the inner wall of the stub-axle, and the ends 2 and 3 being seated within a central chamber 5 formed in said stub-axle, one above and the other below said tongue. Disposed in seats 6 and 7 formed respectively in the upper face of the tongue 4 and in the inner surface of the lower wall 8 of the stub-axle are ball races 9 and 10 opposed by supplemental races 11 and 12 that bear against the under sides of the ends 3 and 2, the pairs of races being held properly spaced by balls 13 in the usual manner. The stub-axle and axle ends are provided with the usual registering pivot-pin openings.

The stub-axle, axle ends and bearings are held operatively assembled by a pivot-pin 14 constructed from a smooth cylindrical length of metal. In order to enable the axle to withstand the wear to which it will necessarily be subjected, the pivot-pin openings through the axle-ends are made larger than the pin to receive metal bushings 15 that are forced into said openings and are retained therein by frictional contact with the walls of said openings. When the parts are assembled the pivot-pin fits tightly into its openings in the stub-axle, and snugly into the openings of the axle-ends to permit said axle-ends to pivot freely thereon, as is apparent.

To prevent entrance of dust, snow and slush to the pivot-pin and ball bearing races surrounding the same, there is arranged in the outer end of the chamber 5, at each side thereof, between its vertical walls and the curved vertical outer walls of the recess $a$, in the boss 1 of the axle, and in contact therewith, a packing 44, preferably of felt, that is held in place by obliquely disposed plates 45 secured by screws 46 seated in the inner wall of the stub-axle, as shown in Figs. 2, 4 and 5. The outer curved surfaces of the walls of the recess $a$ are of such length that there will always be contact between such walls and the packing 44 regardless of the extent of the pivoting of the stub-axle on the axle ends. This oblique arrangement of the packing 44, not only prevents the entrance of dust, dirt, etc., to the interior of the stub-axle, but permits a greater extent of pivoting of said stub-axle on said axle ends, as is evident.

Surrounding the stub-axle is one ring 16 of a roller bearing race, the opposing ring 17 being seated in a recess 18 formed in the inner wall of the hub. The ring 16 is provided with a rounded flange 19 that engages a similarly shaped shoulder 20 on the stub-axle, and the ring 17 is provided with a rounded flange 21 that engages a similarly shaped shoulder 22 at the inner end of the recess 18 in the hub, the two flanges being oppositely disposed to provide a raceway for a series of roller bearings 23 that are disposed parallel with the longitudinal axis of the hub and are held in place by the roll retainers 24, the ends of these bearings being convex to take up end thrust. In order to insure the retention of lubricant and prevent the entrance of dust, snow and slush to the race rings 16 and 17 and the roller bearings 23 therein, there is arranged at the inner end of the hub, contiguous to the outer ends of the rings 16 and 17, a felt packing-ring 40 that is held in place by a ring-nut 41 that is threaded into the hub, and is provided with sockets 42 to be engaged by a spanner wrench, the nut 41 being held against working loose or becoming lost by locking screws 43 threaded into the hub and having their heads lapping the outer surface of said ring-nut 41, as shown.

The outer end of the stub-axle is provided with a spindle 25 having a reduced threaded terminal 26 on which is seated a jam-nut 27 and a locking nut 28. Surrounding the spindle is one ring 29 of a roller bearing race, the opposing ring 30 being seated in a recess 31 formed in the inner wall of the outer end of the hub, the race defining a circumferential shoulder or bearing 32, the inner wall 33 of which is curved and is engaged by a similarly shaped flange 34 on the inner end of the ring 30, the inner end of the ring 29 being arranged to engage the shoulder 35 of the spindle 25. The outer end of the ring 29 is provided with a circumferential flange 36 having its inner wall curved, and this flange in conjunction with the flange 34 of the ring 30 defines a channel for the reception of the roller bearings 37, the ends of which are rounded to take up end-thrust and engage the rounded surfaces of the flanges 34 and 36. 38 are suitable roller retainers interposed between the ends of the rings 29 and 30, and are designed to hold the rollers in place when the bearing is removed. While the roller bearings interposed between the stub-axle and hub may be cylindrical, as shown in Fig. 1, I prefer to use the tapered rollers shown in Fig. 3, as it has been found that the purpose for which they are designed may be more quickly and effectually accomplished.

A feature of novelty in the invention resides in the fact that the race rings 29 and 30 and the rollers 37, in conjunction with the nuts 27 and 28, constitute the means for holding the hub and stub-axle assembled and also for taking up wear in all bearings interposed between the hub and the stub-axle, it being seen by reference to Fig. 1 that when said nuts are properly seated, the ring 29 will be held firmly and positively against lateral or endwise movement, while the ring 30 will be similarly retained in place by means of the interposed rollers 37 which engage the shoulder 34 of said ring 30. The cap 39 threaded on the outer end of the hub is of the usual construction and for the usual purpose.

The hub flanges 47 and 48 are of the usual or any preferred construction, the flange 48 being detachable to permit insertion of the spokes.

The structure shown in Figs. 3 and 5 is the same as that above described, except that the roller bearings 49 and 50 are disposed obliquely to the axis of the hub.

In the construction shown in Fig. 5, the plates 57 for the axle-end packing 58 are obliquely disposed relative to the axis of the hub, and are secured to the stub-axle by screws 62. The ring-nut 59 shown in this figure is provided with an inwardly projecting flange 60 to engage the packing ring 61.

In each form of the above described invention the operation thereof is the same, and accomplishes the functions stated in a practical and certain manner. It is to be understood that various changes in the construction and arrangement of the parts may be adopted without departing from the invention defined in the claims.

What is claimed is:

1. A steering knuckle having in combination, a stub-axle provided with a pivot-pin opening, and having therein a central open-end chamber with a flat substantially circular tongue projecting axially and horizontally from the inner end wall thereof, an axle having substantially circular bosses at the ends thereof with a pivot-pin opening therein, each boss being horizontally bifurcated to the pivot-pin opening and having a substantially semi-circular recess therein extending from said bifurcation into said boss, said bifurcated boss being adapted to set into the chamber in the stub-axle, and the tongue in the stub-axle being adapted to set in said bifurcation and into the adjoining recess, and a pivot-pin for holding said parts assembled.

2. A steering knuckle having in combination, a stub-axle provided with a pivot-pin opening, and having therein a central open-end chamber with a flat substantially circular tongue projecting axially and horizontally from the inner end wall thereof, an axle-end having a substantially circular boss with a pivot-pin opening therein, said boss being horizontally bifurcated to the pivot-pin opening and having a substantially semi-circular recess therein extending from said bifurcation into said boss, said boss being adapted to set into the chamber in the stub-axle, and the tongue in said chamber being adapted to set in said bifurcation and into the adjacent recess, and a pivot-pin for holding said parts in assembled position, packing strips arranged in the outer end of said chamber, one at each side thereof, adapted to bear against and sweep the vertical curved walls of said circular boss between the bifurcation therein and the axle, and obliquely disposed retaining plates secured to said stub-axle and adapted to hold said packing strips in position.

In testimony whereof I affix my signature in the presence of two witnesses.

ELMER E. McINTYRE.

Witnesses:
E. F. HESELBARTH,
O. W. HESELBARTH.

Copies of this patent may be obtained for five cents each, by addressing the "Commissioner of Patents, Washington, D. C."